United States Patent [19]
Ratzel et al.

[11] 4,456,861
[45] Jun. 26, 1984

[54] AUTOMATIC POSITIONING SYSTEM FOR FULLY RECLINING VEHICLE SEATS

[75] Inventors: Rüdiger Ratzel, Bühl; Erich Schneider, Kirchheim, both of Fed. Rep. of Germany

[73] Assignee: Robert Bosch GmbH, Stuttgart, Fed. Rep. of Germany

[21] Appl. No.: 415,433

[22] Filed: Sep. 7, 1982

[30] Foreign Application Priority Data

Sep. 10, 1981 [DE] Fed. Rep. of Germany ....... 3137150

[51] Int. Cl.³ .............................................. G05B 19/42
[52] U.S. Cl. .................................. 318/568; 318/103; 318/112
[58] Field of Search ............... 318/568, 603, 103, 112; 297/330

[56] References Cited

U.S. PATENT DOCUMENTS

| | | | |
|---|---|---|---|
| 3,042,170 | 7/1962 | Tschirf | 318/568 X |
| 4,128,797 | 12/1978 | Murata | 318/568 X |
| 4,264,849 | 4/1981 | Fleischer et al. | 318/603 X |

*Primary Examiner*—B. Dobeck
*Attorney, Agent, or Firm*—Frishauf, Holtz, Goodman & Woodward

[57] ABSTRACT

A fully reclinable front seat of a vehicle in which one positioning motor controls seat back inclination, and another controls forward and back shifting of the seat, is prevented from malfunction resulting from interference with the rear seat by blocking downward movement of the seat back beyond 30° until the seat has moved fully forward, and by blocking longitudinal movement of the front seat while the seat back is rising and has not yet reached 30° inclination.

3 Claims, 1 Drawing Figure

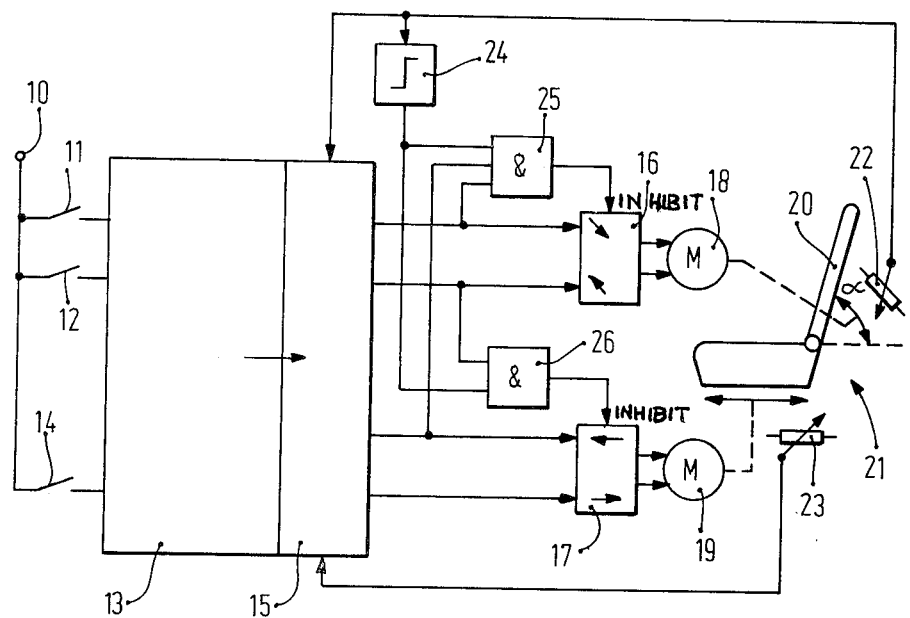

AUTOMATIC POSITIONING SYSTEM FOR FULLY RECLINING VEHICLE SEATS

This invention concerns means for positioning fully reclining seats in a vehicle so as to convert the vehicle from normal seating to a flat bed condition for rest during a long voyage. The invention concerns a servo type of seat positioning utilizing positioning motors for longitudinal seat position, seat back information and possibly some other positioning factor, operative upon a simple command such as produced by pressing a switch button.

Electric motor controls for adjusting the position of a vehicle seat are known from published German patent applications Nos. DE-OS 27 34 264 and DE-OS 28 18 806, and likewise in corresponding disclosures in U.S. Pat. No. 4,264,849.

The desired position in such known systems is produced by positioning motors for changing the seat-back information and the longitudinal seat position respectively. A servo control loop is provided to which desired seat positions are given in the form of electrical signals, the actual seat positions are likewise so provided for generating an error signal in response to which the actual seat positions are changed in the direction of the desired seat positions, and when the error signal disappears because of the loop balance, the positioning motors are shut down.

In the case of fully reclining seats that may be required to change from a flat bed position to a normal seating position, however, there are possible positioning operations, out of certain particular actual positions or into certain particular desired positions, that present the danger that the movement of the front seat will either press hard against the rear seat or lift the rear seat out of position. This danger is particularly present in automatically positioning the front seat into the laid-down position or raising it out of the fully laid-down position.

THE INVENTION

It is an object of the present invention to provide a system for positioning a fully reclining seat of a vehicle so as to avoid damaging interference between the reclining seat and an obstruction to the rear thereof, such as the rear seat in the case of a reclining front seat and some other kind of an obstruction in the rear portion of the vehicle in the case of a reclining rear seat in a station wagon or the like.

Briefly, a logic circuit is provided for blocking the downward movement of the seat back beyond a predetermined angle, while a signal for forward movement of the seat position exists and, likewise, for blocking the rearward movement of seat position when the seat back inclination is less than a predetermined angle to the horizontal and a signal is present for raising the seat back.

THE DRAWING

The invention is further described by way of illustrative example with reference to the annexed drawing, in which the single figure is a schematic diagram of a seat position control system according to the invention with the logic circuit portion shown as a circuit block diagram.

DESCRIPTION OF THE ILLUSTRATED EMBODIMENT

The terminal 10 shown at the upper left of the drawing is connected to a voltage supply source not shown in the drawing, for example a starter battery of the motor vehicle. Position setting data are entered manually in a storage and command module 13, which may be a micro-computer, this being shown in the figure as being accomplished by switches 11 and 12, each of which enters all the data defining some particular desired position, for example flat-bed position in the case of one switch and normal seating position in the case of the other, into storage in the module 13, and are also used for calling out the thus stored data as explained below. The switch 14 is another control connecting the battery to the module 13 for enabling storage of data when, at the same time, one of the switches 11 and 12 is actuated. The storage and command module 13 includes servo-control loop means 15 to which the module 13 provides desired position signals and positioning commands. These servo-control loop means 15 are constituted for operating the positioning motor 18 for the inclination of the seat back 20 of a vehicle seat 21 and the positioning motor 19 for lengthwise shifting of the same vehicle seat 21, in each case operating these motors through the final stages 16 and 17, respectively. The actual position signals regarding the two positioning movements are picked off as voltages from the respective potentiometers 22 and 23 and supplied to the servo-control loop means 15.

What has so far been described is known from the disclosure of the references cited above, which are hereby incorporated by reference for all further details of operation of the circuits just described. It is observed in this regard, however, that the storage and command module 13 and the servo-control loop means 15 do not need to be incorporated in a micro-computer, as here illustrated, and can of course, if desired, be constituted as a collection of circuits utilizing discrete components.

The signal representing the actual seat-back inclination is, in accordance with the invention, supplied to a threshold stage 24, the output of which is provided to one input of each of the AND-gates 25 and 26. The output of the AND-gate 25 is provided to an inhibit input of the final control stage 16, and the output of the AND-gate 26 is connected with an inhibit input of the final control stage 17. The control input of the final stage 16 for producing downward movement of the seat back 20 is connected also with a second input of the AND-gate 25. A third input of the AND-gate 25 is connected to the control input of the final stage 17 for forward movement of the vehicle seat. Finally, the control input of the final stage 16 for control of upward movement of the seat back 20 is connected to a second input of the AND-gate 26. The entry of desired positions in to the storage and command module 13, as disclosed in the prior art references cited above, is performed by actuating the storage control switch 14 and thereafter also one of the positioning switch devices 11 and 12. If thereafter the seat is to be moved into one of the positions specified in the stored information, it is sufficient to actuate one of the positioning switch devices 11 or 12, in response to which the stored data regarding the desired position, will be provided to the servo-control loop means 15. The appropriate positioning motor 18 or 19, or both, then is set into movement in order to change the actual position of the seat and/or seat back in the direction of the desired position. This takes place by applying a control signal to one or the other control inputs of the final control stage 16 and/or the final control stage 17. The two control inputs of each of these final stages are respectively related to the two directions of positioning which can be produced by the operation of the motor which the stage controls. A position once reached is maintained until a command is provided for shifting to another position, either by actuating another one of the positioning switches 11 and 12 (and there may be more of two of these) or else by direct control of the positioning motors 18 and/or 19 by means not shown in the drawings that may be provided, if desired.

If now, for example, the vehicle seat 21 is in the fully reclined (flat-bed) position, which is typically at a 0° angle with reference to the horizontal vehicle chassis reference claim, and if the seat is to be shifted into normal seating position, the vehicle seat must usually be moved backwards and the seat-back inclination must be increased. If both these movements start up simultaneously, there is the danger that the seat back 20 will be pressed against the rear vehicle seat and lift up the latter because of the upward movement. In order to prevent this, the threshold value stage 24 produces an outward signal so long as the seat back inclination angle $\alpha$ is less than, for example, 30°. This signal causes the AND-gate 26 to produce a 1-signal if at the same time a control signal for producing upward movement of the seat back 20 is present. This one signal from the AND-gate 26 is supplied to the inhibit input of the final stage 17 and blocks the positioning movement of the motor 19 for longitudinal movement of the front seat 21. This blocking effect can be produced, for example, by simultaneous application of one-signals to both control inputs of the final stage 17 in the manner disclosed in greater detail in our copending patent application Ser. No. 415,351, filed Sept. 7, 1982, claiming the priority of German patent application No. P 31 35 888.8. On the basis of such blocking of the final stage 17, the rearward movement of the seat 21 begins only after the seat back inclination angle $\alpha$ increases past 30°.

A similar damaging interference of the seat back 20 and the rear seat located behind it can occur in the converse situation, when the front seat is being put into the fully reclined position. What can happen in this case is that with simultaneous operation of the two positioning motors 18 and 19, the downwardly moving seat back 20 presses together the rear vehicle seat if the forwardly moving front seat 21 has not yet reached a sufficient spacing from the rear seat. In order to prevent this, the movement of the seat back 20 is prevented by blocking the final control stage 16. The output signal of the AND-gate 25 needed for that purpose is then produced whenever at the same time an output signal of the threshold stage 24 appears, and also control signals for respectively causing downward movement of the seat back 20 and forward movement of the seat 21. As the result of the blocking logic 24,25, both positioning motors 18 and 19 are at first put into operation. As soon as a seat back inclination of less than 30° is reached, the positioning motor 18 is blocked, so that further forward movement of the vehicle seat 21 takes place with a constant seat back inclination of 30°. Only when the final forward position of the vehicle seat 21 is reached, so that the control signal for producing the forward movement disappears, can the seat back 20 move down further, as the result of the positioning motor 18 being switched back into operation as the result of removal of the inhibiting signal, whereupon the seat back moves down until the desired inclination angle of, for example, 0° is reached.

It is to be understood that when the storage and command module 13 and the servo-control loop means 15 are constituted together as a micro-computer, the blocking or interlock logic circuit 24,25,26 can likewise have its functions performed by the same micro-computer, in effect incorporating the logic circuit in the micro-computer.

Although the invention has been described with reference to a particular illustrative example, it will accordingly be understood that variations and modifications are possible within the inventive concept.

We claim:

1. Apparatus for controlling coordinated operation of a plurality of positioning mechanisms for fully reclinable vehicle seats by electrical servo-control loop means in response to the activation of signals respectively representing a desired seat-back inclination setting and a sesired longitudinal seat position, said servo-control loop means including means for generating signals respectively representing actual seat-back inclination and actual longitudinal seat position, and means for producing error signals for respectively controlling said positioning mechanisms, said apparatus incorporating the improvement comprising logic circuit means for blocking the operation of the one of said positioning mechanisms controlling seat-back inclination while said servo-control loop means are providing an error signal for producing forward movement of seat position by said longitudinal seat positioning mechanism so long as said actual seat inclination signal represents an inclination angle with respect to the horizontal less than a predetermined angle ($\alpha$).

2. Apparatus for controlling coordinated operation of a plurality of positioning mechanisms for fully reclinable vehicle seats by electrical servo-control loop means in response to the activation of signals respectively representing a desired seat back inclination setting and a desired longitudinal seat position, said servo-control loop means including means for generating signals respectively representing actual seat back inclination and actual longitudinal seat position, and means for producing error signals for respectively controlling said positioning mechanisms, said apparatus incorporating the improvement comprising logic circuit means for blocking the operation of the one of said positioning mechanisms controlling longitudinal seat position while said servo-control loop means are providing an error signal for increasing the seat back inclination angle with respect to the horizontal, so long as said actual seat inclination signal represents an inclination angle less than a predetermined angle ($\alpha$).

3. Apparatus as defined in claim 1, in which said logic circuit means also includes means for blocking the operation of the one of said positioning mechanisms controlling longitudinal seat position while said servo-control loop means are providing an error signal for increasing the seat back inclination angle with respect to the horizontal, so long as said actual seat inclination signal represents an inclination angle less than a predetermined angle ($\alpha$).

* * * * *